United States Patent [19]

Meyn

[11] Patent Number: 5,299,976
[45] Date of Patent: Apr. 5, 1994

[54] APPARATUS FOR RETAINING POULTRY

[75] Inventor: Cornelis Meyn, Oostzaan, Netherlands

[73] Assignee: Machinefabriek Meyn B.V., Oostzaan, Netherlands

[21] Appl. No.: 31,806

[22] Filed: Mar. 15, 1993

[30] Foreign Application Priority Data

Mar. 24, 1992 [NL] Netherlands ............... 9200538

[51] Int. Cl.$^5$ ............................................ A22C 21/00
[52] U.S. Cl. ................................. 452/188; 452/106
[58] Field of Search ............... 452/188, 182, 117, 118, 452/120, 106

[56] References Cited

U.S. PATENT DOCUMENTS

| | | |
|---|---|---|
| 3,798,708 | 3/1974 | Scheier . |
| 3,802,028 | 4/1974 | Scheier et al. . |
| 4,059,868 | 11/1977 | Meyn .................... 452/120 |
| 4,131,973 | 1/1979 | Verbakel ............... 452/117 |
| 4,382,314 | 5/1983 | Graham ................ 452/118 |
| 4,532,676 | 8/1985 | Simmons . |
| 4,616,380 | 10/1986 | Tieleman . |
| 4,660,256 | 4/1987 | Innes et al. ........... 452/182 |
| 4,669,148 | 6/1987 | Scheier . |
| 4,723,340 | 2/1988 | Markert . |
| 4,731,907 | 3/1988 | Tieleman ............... 452/120 |
| 4,910,829 | 3/1990 | Simmons . |
| 5,154,664 | 10/1992 | Hazenbroek et al. ... 452/117 |

FOREIGN PATENT DOCUMENTS

| | | |
|---|---|---|
| 0236242 | 9/1987 | European Pat. Off. . |
| 85241261 | 12/1985 | Fed. Rep. of Germany . |
| 7303652 | 9/1973 | Netherlands . |

Primary Examiner—Willis Little
Attorney, Agent, or Firm—Dority & Manning

[57] ABSTRACT

Apparatus for retaining poultry suspended with its legs from a suspension conveyor while submitting the poultry to a processing operation. The apparatus comprises two horizontally spaced apart retaining plates receiving the poultry therebetween. The plates are movable between an upper position for engaging the thighs of the poultry and a lower position for engaging the wings of the poultry. In a preferred embodiment the apparatus comprises a brace applicable between the legs of the poultry and supports applicable underneath the wings of the poultry.

12 Claims, 2 Drawing Sheets

APPARATUS FOR RETAINING POULTRY

TITLE OF THE INVENTION
BACKGROUND OF THE INVENTION

The invention relates to an apparatus for retaining poultry suspended by its legs from a suspension conveyor while submitting the poultry to a processing operation such as the removal of the entrails from the abdominal cavity.

Often, high loads are applied to poultry which is submitted to a processing operation. In order to allow a successful operation, the poultry should be retained or held to realize the desired relative movement between the processing means and the poultry. An example of a processing operation is the removal of the entrails from the abdominal cavity of a bird using an eviscerating means. Because the entrails package should be torn loose or cut loose from the remaining poultry body, excessive forces are applied onto the bird trying to displace it. In order to guarantee an effective evisceration care should be taken that the bird assumes a substantially stationary position relative the eviscerating means.

OBJECTS AND SUMMARY OF THE INVENTION

It is a principal object of the invention to provide an apparatus for retaining poultry suspended from a suspension conveyor for processing thereof.

Additional objects and advantages will be set forth in part in the description which follows, and in part will be obvious from the description, or may be learned by practice of the invention. The objects and advantages of the invention may be realized and attained by means of the instrumentalities and combinations particularly pointed out in the appended claims.

The apparatus according to the invention is characterized by two horizontally spaced apart retaining plates receiving the poultry therebetween. The plates are movable upwards and downwards between an upper position for engaging the thighs of the poultry and a lower position for engaging the wings of the poultry.

The retaining plates according to the invention fulfill a double function: in the upper position they engage the thighs of the poultry for obviating a downward displacement of the poultry, for example in reaction to the forces created by the entrance of an eviscerating means in the abdominal cavity of the poultry. In the lower position, however, the retaining plates engage the wings of the poultry thus obviating an upward movement of the poultry, for example when the eviscerating means tears loose the entrails package from the abdominal cavity. Because the retaining plates combine these two functions, an apparatus is provided combining an effective operation with a constructive simplicity.

In correspondence with a preferred embodiment, each retaining plate comprises an upper and lower clamping surfaces. In the upper position the upper clamping surfaces are operative, whereas in the lower position the lower clamping surfaces are operative. Further, in correspondence with another embodiment of the apparatus according to the invention, it is handy if a brace is provided applicable between the legs of the poultry, said brace in the upper position of the retaining plates engaging the lower body portion of the poultry. As a result of the co-operation of the brace and the retaining plates, the bird is effectively clamped at its thighs or hips such that a displacement of the bird is virtually not possible.

When applying such a brace it is preferable that it comprises a U-shaped brace mainly extending in a horizontal plane. As a result, the brace provides no obstruction for the application of a processing means or the like in the abdominal cavity of the poultry. Further, this brace provides positioning of the poultry in horizontal direction independently from the dimensions of the separate birds.

In accordance with another advantageous embodiment of the apparatus according to the invention, supports are provided which are applicable underneath the wings of the poultry, said supports in the lower position of the retaining plates engaging the wings of the poultry.

Due to the co-operation between the supports and the retaining plates located in the lower position, the wings of the poultry are firmly clamped, such that in this position the bird is prevented from moving.

In such a case it is preferred that each support comprises two support members that, relative to the respective retaining plate, are horizontally staggered inwardly and outwardly, respectively. Because of the staggered location of the support members and the retaining plate the wings are firmly clamped, but not damaged when having differing dimensions. This is because the staggered location of the support members and the retaining plate allows a less or more curved contour of the wings.

In correspondence with another embodiment, the supports further may also provide an inlet guide for the poultry which adds to correctly positioning a bird in the apparatus.

Hereinafter the invention will be elucidated referring to the drawing, in which an embodiment of the apparatus according to the invention is illustrated.

DESCRIPTION OF THE PREFERRED EMBODIMENTS

Figure 7:
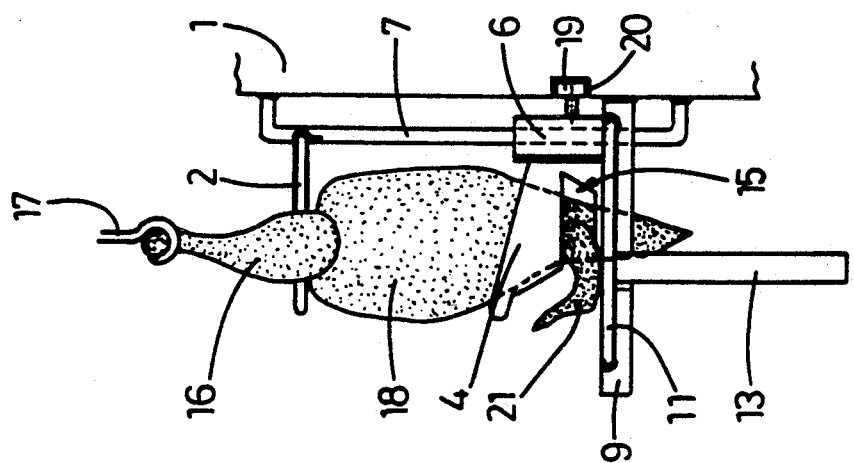
FIG. 7 shows a side elevational view of FIG. 6.

Reference will now be made in detail to the presently preferred embodiments of the invention, one or more examples of which are illustrated in the drawings. Each example is provided by way of explanation of the invention, not limitation of the invention. The numbering of components in the drawings is consistent through the application, with the same components having the same number in each of the drawings.

Figure 1:
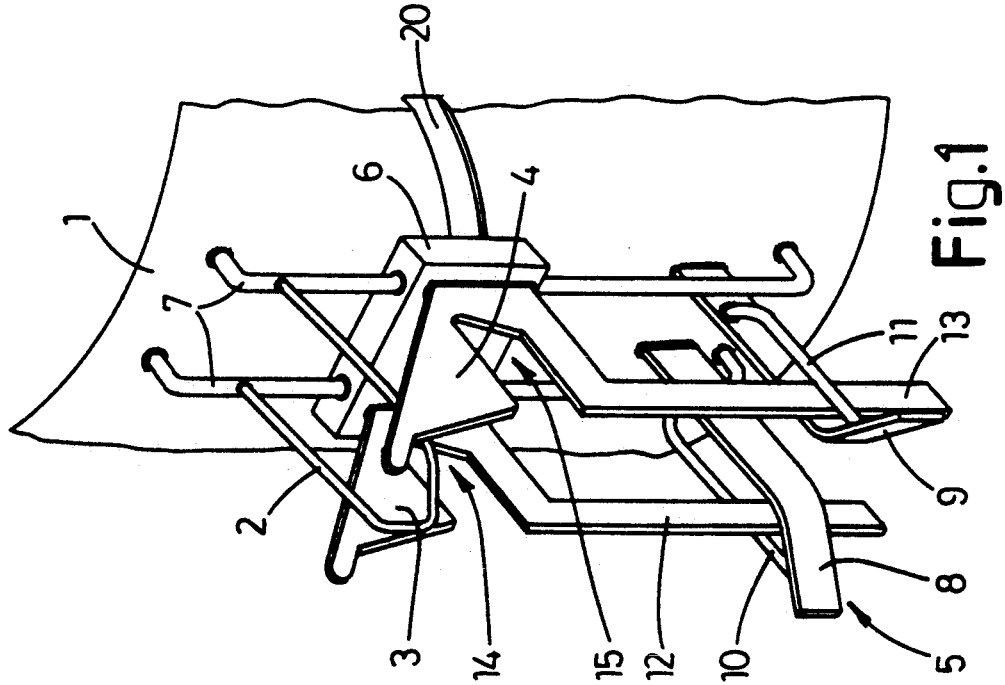
FIG. 1 shows perspectively an embodiment of the apparatus according to the invention.

In FIG. 1 a part is shown if a known rotating processing apparatus 1 of the type as applied on a large scale in the processing of poultry. Briefly, such a processing apparatus 1 comprises a drum rotating about a vertical axis and carrying processing stations regularly spaced around its circumference for carrying out specific processing operations on supplied birds. Generally, the birds are then supplied through a suspension conveyor in which the birds are suspended with their legs.

Thus, FIG. 1 shows that onto the processing apparatus 1 an apparatus is mounted for retaining the poultry while submitting said poultry to a processing operation. The apparatus comprises from top to bottom, a U-shaped brace 2, two retaining plates 3 and 4 and a support and guide assembly 5.

The retaining plates 3 and 4 are attached to a slide 6 which is movable upwards and downwards along a vertical guide 7 mounted onto the processing apparatus 1. For obtaining the upward and downward movement of the slide along the vertical guide 7, the slide comprises a follower roll not shown which, in a way known per se, co-operates with a curved track 20 present at the processing apparatus 1.

The U-shaped brace 2 is attached to the vertical guide 7 and thus assumes a stationary position relative to the processing apparatus 1. Of course the brace 2 might be attached directly to the processing apparatus 1.

In the illustrated embodiment, the support and guide assembly 5 also assumes a stationary position relative to the processing apparatus and is attached directly to the process apparatus 1. It is possible however that this assembly is independently movable upwards and downwards through a slide, for example along the vertical guide 7, similar to retaining plates 3, 4.

FIG. 1 further shows that the support and guide assembly 5 comprises two guide plates 8 and 9 defining an inlet guide for the poultry and two support rods 10 and 11. The ends of the guide plates 8 together form an enlarged inlet section, such that the application of a bird to be processed in the apparatus occurs without any problems. The support rods 10 and 11 are attached to the guide plates 8 and 9.

Finally FIG. 1 shows that the retaining plates 3 and 4 at their lower side are provided with vertically extending guide members 12 and 13. These guide members 12 and 13 extend between corresponding guide plates and support rods 8 and 10 or 9 and 11, respectively. At the upper side the shape of the guide members 12 and 13 is such that in combination with the retaining plates 3 and 4 recesses 14 and 15 are defined. Their function will be elucidated further below.

Figure 2:
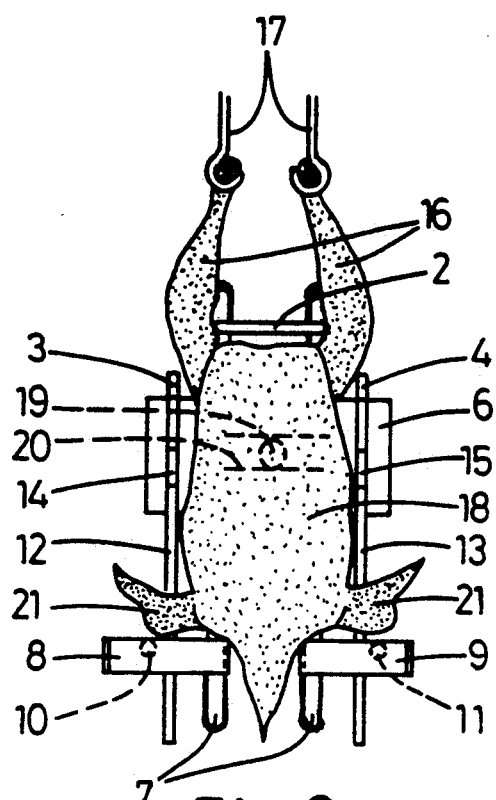
FIG. 2 shows an elevational frontal view of the apparatus of FIG. 1 in a first position.
Figure 3:
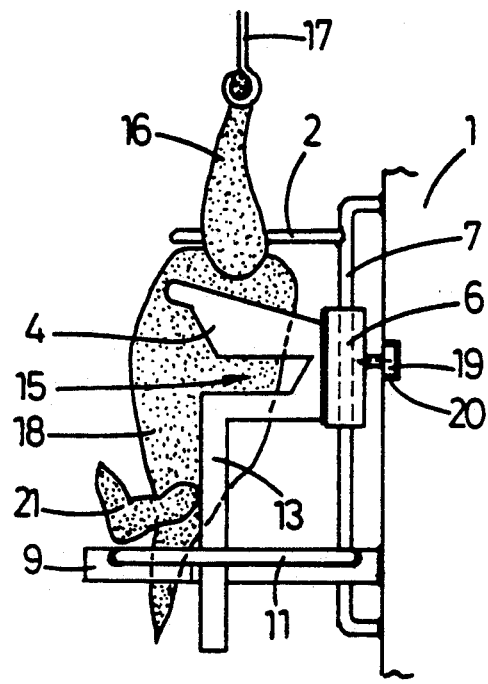
FIG. 3 shows a side elevational view of FIG. 2.

Now the operation of the apparatus illustrated in FIG. 1 will be elucidated referring to FIGS. 2 through 7. FIGS. 2 and 3 represent in a front elevational view and side elevational view, respectively, a position of the apparatus immediately after applying therein a bird 18 suspended with its legs 16 from a suspension conveyor 17. The U-shaped brace 2 extends between the legs 16, but does not necessarily engage the lower body part of the bird 18. As a result of the co-operation between a follower roll 19 and a curved track 20 provided at the processing apparatus 1, the slide 6 is located in an intermediate position, in which the retaining plates 3 and 4 do not engage the legs 16 nor the wings 21 of the bird. The wings 21 rest against the guide members 12 and 13, but are mainly free from the guide plates 8 and 9 and from the support rods 10 and 11.

Figure 4:
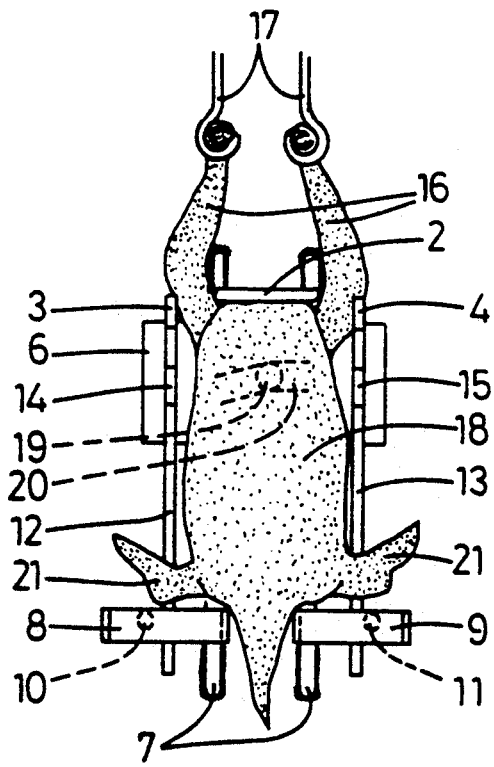
FIG. 4 shows the apparatus in a second position.
Figure 5:
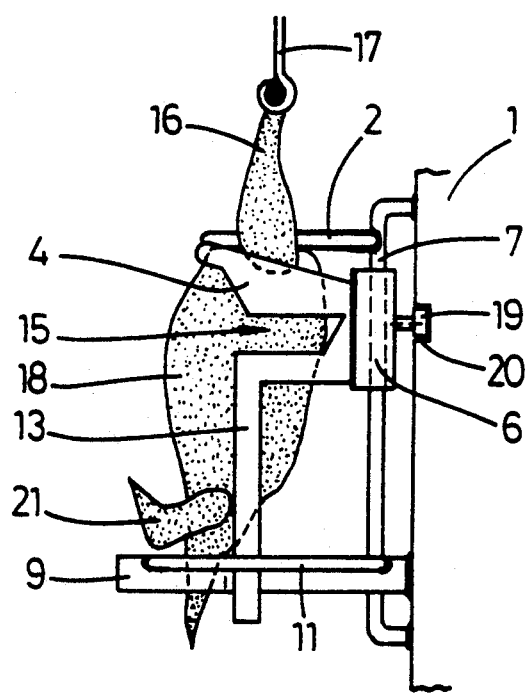
FIG. 5 shows a side elevational view of FIG. 4.

FIGS. 4 and 5 show a position of the apparatus in which the retaining plates 3 and 4, as a result of the co-operation between the follower roll 19 and the curved tract 20, are moved upwards so that the legs 16 of the bird 18 are clamped at the hips or thighs between the upper edges of the retaining plates 3, 4 acting as upper clamping surfaces and the U-shaped brace 2. In this position the U-shaped brace 2 engages the lower body portion of the bird 18. In this position a processing means, for example an eviscerator for removing the entrails from the body cavity of the bird, may be applied without a resulting downward displacement of the bird.

Just as in the position illustrated in FIGS. 2 and 3 the wings 21 rest against the guide members 12 and 13, whereas the guide plates 8, 9 and the support rods 10, 11 are mainly inoperative.

Figure 6:
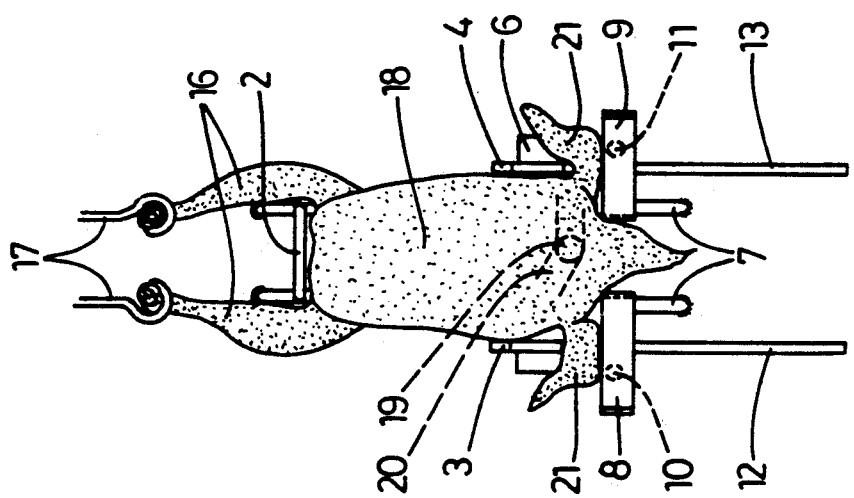
FIG. 6 shows the apparatus in a third position.

Finally, FIGS. 6 and 7 show a lowermost position of the apparatus. This position again will be reached as a result of the co-operation between the follower roll 19 and the curved track 20. The retaining plates 3 and 4 have been moved downwards so that the wings 21 of the bird 18 are received in the respective recesses 14 and 15. The lower edges of the retaining plates 3 and 4 acting as lower clamping surfaces engage the wings 21 and press these against the support rods 10 and 11. Further the bird rests upon the guide plates 8 and 9. In this position an upwardly directed force may be applied onto the bird (for example by an eviscerating means while tearing loose the entrails) without the bird moving upwards.

The embodiment described previously may be varied widely within the scope of the invention. In this respect it is possible that the retaining plates 3 and 4 have a shape different from that shown in the drawings. Specifically the lower edge or upper edge respectively, of each retaining plate acting as clamping surface may comprise a recess (such as a V-shaped depression) for horizontally positioning the birds or thighs, respectively. Further it is possible too that the apparatus does not have guide members 12 and 13. Moreover the movement of the retaining plates 3 and 4 might be caused in a different way from the follower roll and curved track described.

It will be apparent to those skilled in the art that various modifications and variations can be made in the present invention without departing from the scope or spirit of the invention. For instance, features illustrated or described as part of one embodiment, can be used on another embodiment to yield still a further embodiment. Thus, it is intended that the present invention cover such modifications and variations as come within the scope of the appended claims and their equivalents.

I claim:

1. An apparatus for retaining poultry suspended from a suspension conveyor in position while submitting the poultry to a processing operation, said apparatus comprising:

two horizontally spaced apart retaining plates, said plates for receiving the poultry therebetween, said plates defining an upper engaging position and a lower engaging position; and means for moving said plates between said upper engaging position and said lower engaging position so that at said upper engaging position said plates engage a first body part of the poultry to prevent downward movement of the poultry, and at said lower engaging position said plates engage a second body part of the poultry to prevent upward movement of the poultry.

2. The apparatus as in claim 1, wherein at said upper engaging position said plates engage the thighs of the poultry and at said lower engaging position said plates engage the wings of the poultry.

3. The apparatus as in claim 1, wherein each said plate further comprises upper and lower clamping surfaces at said upper and lower engaging positions respectively.

4. The apparatus as in claim 1, further comprising a brace member disposed generally at said upper engaging position, said brace configured to fit between the legs of the poultry and to engage the lower body portion of the poultry when said plates are at said upper engaging position.

5. The apparatus as in claim 4, wherein said brace comprises a U-shaped member extending generally horizontally from said plates.

6. The apparatus as in claim 4, further comprising support devices disposed generally at said lower engaging position, said support devices configured to engage the wings of the poultry when said plates are at said lower engaging position.

7. The apparatus as in claim 6, wherein each said support device comprises two spaced apart support members extending generally horizontally from said plates.

8. The apparatus as in claim 7, wherein said support members define an inlet guide for the poultry between said plates.

9. The apparatus as in claim 6, wherein said support devices are movable upwards and downwards.

10. The apparatus as in claim 1, wherein said plates further comprise vertically extending guide members for engaging the wings of the poultry when said plates are at said upper engaging position.

11. The apparatus as in claim 7, wherein said plates further comprise vertically extending guide members for engaging the wings of the poultry when said plates are at said upper engaging position, said guide members disposed between and movable relative said spaced apart support members.

12. The apparatus as in claim 1, wherein said means for moving said plates comprises a slide movable along vertical guide posts, said plates secured to said slide, said slide configured to be raised and lowered by means of a curved track and follower roller mechanism.

* * * * *